C. HARDGRAVE.
Cultivator.
No. 218,526. Patented Aug. 12, 1879.
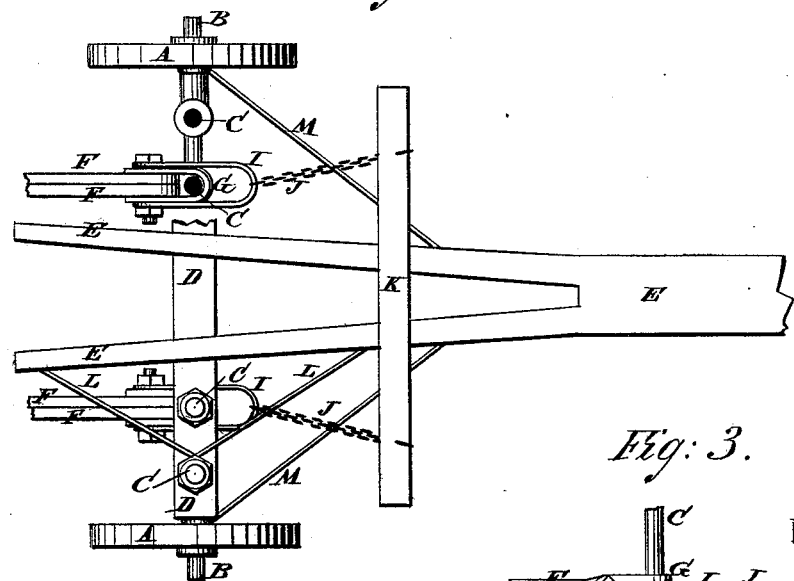
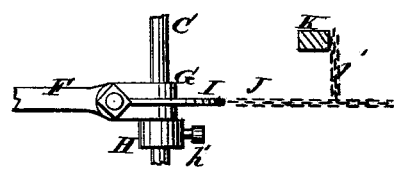
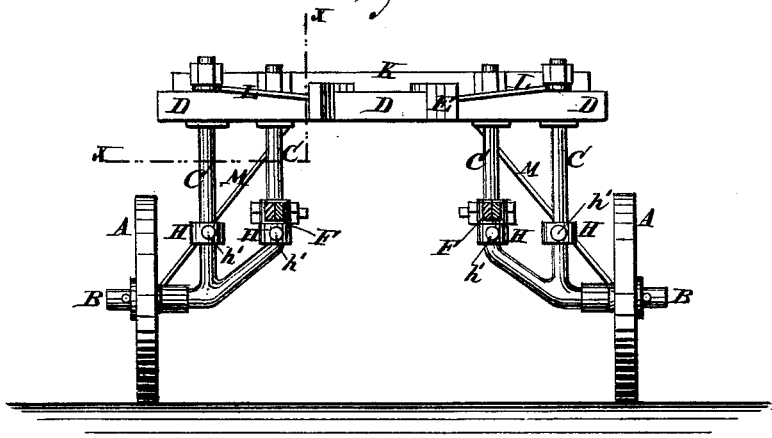
WITNESSES:
Achilles Sehehl.
C. Sedgwick
INVENTOR:
C. Hardgrave
BY Munn & Co
ATTORNEYS.

UNITED STATES PATENT OFFICE.

CAGER HARDGRAVE, OF CLARKSVILLE, ARKANSAS.

IMPROVEMENT IN CULTIVATORS.

Specification forming part of Letters Patent No. 218,526, dated August 12, 1879; application filed June 2, 1879.

*To all whom it may concern:*

Be it known that I, CAGER HARDGRAVE, of Clarksville, in the county of Johnson and State of Arkansas, have invented a new and useful Improvement in Cultivators, of which the following is a specification.

Figure 1 is a top view of my improved cultivator, partly in section through the line $x\ x$, Fig. 2, to show the construction. Fig. 2 is a rear view of the same, the plow-beams being shown in cross-section. Fig. 3 is a detail side view of a part of the same.

Similar letters of reference indicate corresponding parts.

The object of this invention is to furnish an improved cultivator, which shall be so constructed that the plows may be readily adjusted to work deeper or shallower in the ground, as may be desired, and which shall be simple in construction and convenient in use.

The invention consists in the combination of the upright rods, the collars and set-screws, and the clevises with the short axles, the cross-bar to which the tongue is attached, the plow-beams, and the draw-chains, as hereinafter fully described.

A are the wheels, which revolve upon the journals of the short axles B. Upon the inner end of each short axle B are formed two parallel upwardly-projecting rods, C. The upper ends of the two pairs of rods C are attached to the end parts of the cross-bar D, to which the forked rear end of the tongue E is attached.

F are the plow-beams, to the forward ends of which are attached the clevises G, which pass around the rods C, and which are kept at the desired height by collars H, placed upon the said rods C, and secured in place adjustably by set-screws $h'$.

With this construction the plows may be adjusted to work deeper or shallower in the ground by simply moving the collars H down or up.

To the bolt of the clevis G is attached the clevis I, which is made larger than the clevis G, so as to pass around the clevis G and the rod C and work free.

To the bend of the clevis I is attached the rear end of the draw-chain J, to the forward end of which the horse is attached. The draw-chain J is kept from dropping down by a branch chain, $j'$, attached to it, and the other end of which is attached to the end of the cross-bar K, attached at its middle part to the tongue E.

The frame of the machine is strengthened by the braces L, attached to the tongue E and the cross-bar D, and by the braces M, attached to the tongue E and to the axles B.

Having thus described my invention, I claim as new and desire to secure by Letters Patent—

The combination of the upright rods C, the collars and set-screws H $h'$, and the clevises G and I with the short axles B, the cross-bar D, to which the tongue E is attached, the plow-beams F, and the draw-chains J, substantially as herein shown and described.

CAGER HARDGRAVE.

Witnesses:
J. H. BASHAM,
P. W. THOMPSON.